H. T. HILL.
SWINGLETREE AND ATTACHMENT.
APPLICATION FILED DEC. 23, 1910.
1,110,260.
Patented Sept. 8, 1914.
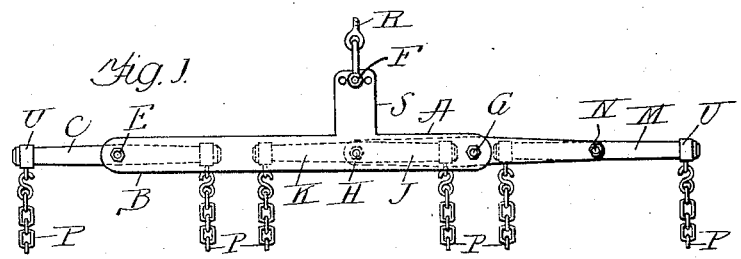
Fig. 1.
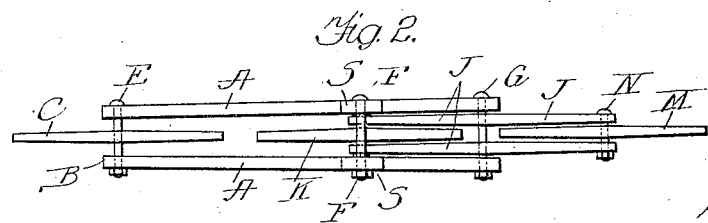
Fig. 2.
Fig. 3.
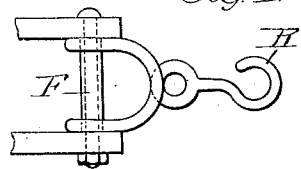
Fig. 4.
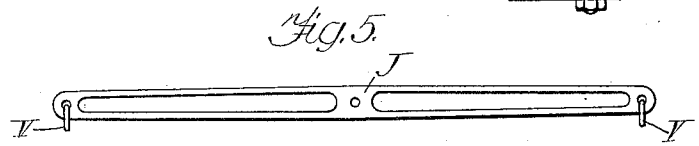
Fig. 5.
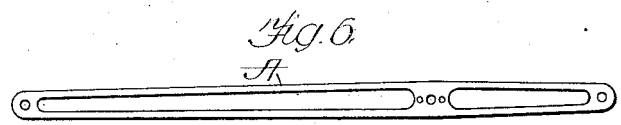
Fig. 6.
Fig. 7.
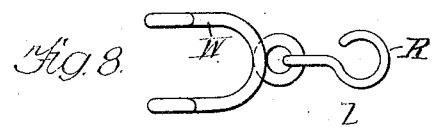
Fig. 8.
Fig. 9.
Witnesses:
Robert N. Weir
Charles G. Cope
Inventor
Hildebrand Tertius Hill
By Jones Addington Ames Seibold
Attys.

UNITED STATES PATENT OFFICE.

HILDEBRAND TERTIUS HILL, OF TAKAPUNA, AUCKLAND, NEW ZEALAND.

SWINGLETREE AND ATTACHMENT.

1,110,260. Specification of Letters Patent. Patented Sept. 8, 1914.

Application filed December 23, 1910. Serial No. 599,047.

*To all whom it may concern:*

Be it known that I, HILDEBRAND TERTIUS HILL, a subject of His Majesty the King of the United Kingdom of Great Britain and Ireland, resident of Takapuna, in the Provincial District of Auckland and Dominion of New Zealand, farmer, have invented Improved Swingletrees and Attachments, of which the following is a specification.

The improvements in this form of swingletrees are intended to provide attachments, which will prevent the ends of the swingletrees from catching obstacles that obstruct the progress of the plow or vehicle, and also to provide for a more even pull, by means of which the draft will be fairly and correctly adjusted and proportioned to the horses or other power drawing the swingletrees.

The swingletrees and attachments are made so as to form one construction, each swingletree being within the construction, but so adjusted therein and thereto, that it will act freely and clearly of its fellows, but at the same time, assist in the common result of drawing the tool or machine or vehicle, behind the construction.

For three horses an outer frame or double master tree, is made, to one end of which, one of the outer swingletrees is pivoted, while to the other end the center of an inner frame, or double master tree, is pivoted. To the inner end of this inner frame or double master tree, which reaches to about the center of the construction, the center swingletree is pivoted, while the other outer swingletree is pivoted to the outer end of this inner frame, or double master tree. The necessary hooks, D-hooks and chains, are provided in the usual way, and can be connected to the power as may be required.

For two horses the inner frame or double master tree, becomes the only frame, and its adjustments are all that are required.

The accompanying drawing shows nine figures of which:—

Figure 1 is a plan of the construction, showing the outer and inner frames, or double master trees, the swingletrees pivoted thereto, and the chains fitted to the swingletrees, Fig. 2, is a front elevation of the same, the chains and chain fittings being omitted; Fig. 3 is a plan of one of the swingletrees, Fig. 4 is a detail view showing in side elevation the shackle and hook provided to connect the device to tool, machine, or vehicle; Fig. 5 is a plan of the inner frame, or double master tree, used as the only frame, Fig. 6 is a plan of the outer frame, or double master tree, Fig. 7 is an elevation, similar to Fig. 2 without the bolts F and G, and with implement connecting device not shown. Fig. 8 is a view of the shackle, the same as in Fig. 4, except that the bolt is dispensed with, and, Fig. 9 is a detail view showing in elevation the center clip provided for attachment to the frame, or double master tree, instead of the projections shown in Fig. 1.

To the outer end B of the outer frame, or double master tree, A, as shown in Figs. 1 and 2, an outer swingletree C is pivoted by bolt E. Secured to the double master tree A, at substantially the center of the device, are a pair of projections or lugs S through which is passed a bolt F and a bolt G is passed through the inner end of the outer frame, or double master tree A. An inner frame or double master tree J, is centrally fitted to the bolt G within the outer frame A, or double master tree. The inner end of the inner frame, or double master tree J, has an inner swingletree K pivoted to it by the bolt H, and an outer swingletree M is adjusted to the outer end of the inner frame or double master tree J, by the bolt N. Chains P are suitably hooked to the ends of the swingletrees as shown in Fig. 1, while a D bolt F with hook R, shown in detail in Fig. 4, is provided and fitted to the projections S of the outer frame or double master tree A.

Fig. 5 shows the inner frame or master tree J when used as the only frame, as in some cases the group of swingletrees will be constructed to suit two horses only, and instead of having a cap U or the like on the end of the swingletree as shown in Fig. 1, a ring or trace link V is or may be used.

Fig. 6 shows the outer frame, or double master tree A, as when made of steel, it will be constructed to suit and act as a master tree for three horses.

Fig. 7 shows the group of swingletrees arranged differently from the form shown in Fig. 2, in that, the ends are brought closer together, and the bolts F and G are dispensed with, and the inner ends of the outer frame A, or double master tree, are held to the inner frame, or double master tree J, by short bolt heads I.

An implement connecting device, as illustrated in Figs. 8 and 9, is substituted for that above described. In place of the projections S, two center clips are fixed to the frame. Each center clip, Fig. 9, comprises an under part X, a side piece Y and pin Z projecting therefrom. The pins Z are engaged by the hooked ends of a D-shackle W, Fig. 8, to which is attached a hook R, and the swingletrees can be used as already described.

The hook R is fitted to the tool, machine or vehicle to be drawn when the construction is to be put in use, and when so fitted and drawn, effect will be given to the invention.

Having now fully described my invention, what I desire to claim and secure by Letters Patent is:—

In a draft equalizer, the main draft frame comprising two transverse bars, connected together in spaced relation one above the other, a swingletree pivotally secured to said frame adjacent one end thereof, between said transverse bars, and a pivoted link, located between the center of said draft frame and the end thereof opposite to said swingletree, for making connection between said draft frame and the device to be drawn, in combination with a subsidiary draft frame comprising two transverse bars connected together in spaced relation one above the other, and a pair of swingletrees pivotally secured to the opposite ends of said subsidiary frame, between said transverse bars, said subsidiary frame being pivotally secured to the end of said main frame opposite to that to which said swingletree is secured, when three draft animals are to be used, but being removable therefrom for use by itself when only two draft animals are to be used, as and for the purposes set forth.

HILDEBRAND TERTIUS HILL.

Witnesses:
 GEORGE WILLIAM BASLEY,
 HILDA MAY FROUDE.

Copies of this patent may be obtained for five cents each, by addressing the "Commissioner of Patents, Washington, D. C."